June 17, 1969
T. T. WEAVER
3,449,856
FLY CATCHER WITH ADHESIVE LINED HEAD PORTION
Filed Dec. 27, 1966
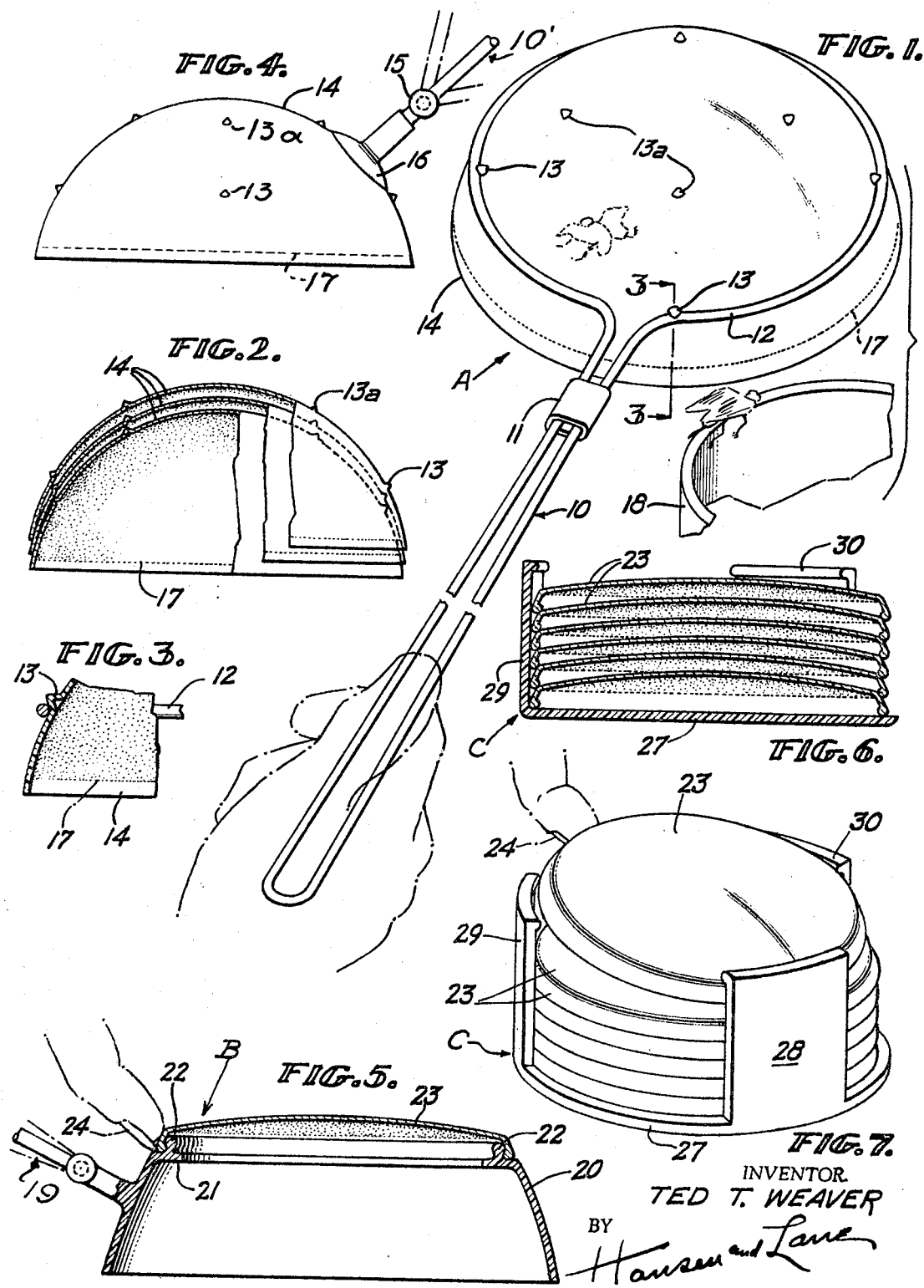
INVENTOR.
TED T. WEAVER
BY Hansen and Lane
ATTORNEYS.

United States Patent Office 3,449,856
Patented June 17, 1969

3,449,856
FLY CATCHER WITH ADHESIVE LINED HEAD PORTION
Ted T. Weaver, Rte. 2, Box 89,
Fallon, Nev. 89406
Filed Dec. 27, 1966, Ser. No. 604,952
Int. Cl. A01m 5/02
U.S. Cl. 43—136    4 Claims

ABSTRACT OF THE DISCLOSURE

A fly catcher comprising an elongated handle releasably attached to a light-weight, throw-away type head member of thin, clear, transparent, plastic material coated on one side thereof with a non-drying, tacky, adhesive substance which will retain a fly upon contact therewith, the head member being shaped for nesting, together with a plurality of similar head members, and being shaped so as to be optionally attached to a transparent base member. The heads are arranged in a package so as to be free for separate removal of individual head members for successive attachment to the handle.

---

The present disclosure has no reference to any related application.

The present invention relates to a fly catcher having a long handle releasably attached to a clearly transparent, adhesive lined throw-away head member which can be gently lowered over a fly at rest on any surface without obscuring the field of vision of the fly or disturbing it until the head member has been lowered into position closely overlying the fly, whereupon the fly usually will fly into the head member where it will retained therein by adherence to the lining. When a desired number of flies have been caught therein, the old head member is detached from the handle and discarded, and is then replaced by a fresh one. The head members are shaped and constructed for nesting into packages and are easily removed therefrom, one at a time, for attachment to the handle.

In the past numerous attempts have been made to provide an adhesive-coated fly catcher, for example, by the use of adhesive coated screen members and the like, but these prior fly catchers, while successful to some extent, have not been sufficiently transparent to prevent the fly from detecting them and flying around them rather than into them. Also, they have not provided easily packaged, inexpensive, replaceable, throw-away adhesively lined members which can be handled without mess to extend the use of the catcher indefinitely.

The present invention effectively solves the problem which is unsolved by any prior art fly catcher of which applicant is aware by providing an elongated, light-weight handle and a plurality of individually replaceable head members thereof, the head members being arranged for stacking in nested or superposed relation, and being shaped in such a manner that although lined on their inner or lower side by a coat of permanently sticky material they do not adhesively inter-engage each other when so stacked and thus are individually removable for attaching to the handle upon removal of a preceding head member therefrom.

In the drawings:

FIG. 1 is a perspective view of a fly catcher embodying the present invention in the act of being lowered over a fly resting on an underlying object, a previously caught fly being shown adherently attached to the interior of the head member.

FIG. 2 is a view, partly in diametric section and partly in elevation, of a plurality of head members of the type shown in FIG. 1 in nested or stacked relation.

FIG. 3 is a fragmentary sectional view taken along line 3—3 of FIG. 1.

FIG. 4 is a side elevational view showing a fragment of a handle having a vacuum cup thereon as it appears when attached to one of a head member of the form shown in FIGS. 1–3.

FIG. 5 is a diametrical sectional view of a modified form of the invention.

FIG. 6 is a diametrical sectional view, and FIG. 7 a perspective view, of a packaging holder with a stack of removable head members of the form shown in FIG. 5 therein, the tip of a person's finger being shown in FIG. 7 in the act of removing the topmost head member.

Referring to the drawings in detail, and considering first the form of the invention shown in FIGS. 1–3, a fly catcher A comprises an elongated wire handle 10 with a slip ferrule 11 mounted thereon for tightening a wire loop 12 formed in one end of the handle about a plurality of small protuberances 13 which are provided on each of a plurality of generally semi-spherical head members 14 as shown in FIG. 2. As illustrated, a first set of four of the protuberances 13 are located to define a plane parallel to that defined by the open base of the head member 14, and are spaced apart by spherical angles of 90°. The protuberances 13 of this first row are located at a height from the base at which they will project radially outwardly from the head member so as to retain the handle loop 12 when it is slipped over and tightened around them as shown in FIGS. 1 and 3. A second set of protuberances 13a, also preferably are provided on each head member 14 and are located to define a plane more remote from the base than those 13 of the first row. The protuberances 13 and 13a prevent adhesive engagement between the adhesive-lined interior of one head member with the exterior surface of a second head member nested therein as shown in FIG. 2.

The head members 14 are of thin, clear, transparent, plastic material made by conventional forming or molding apparatus in a well-known manner to those familiar with the art of plastic fabrication. Since the making of the head members is well within the capabilities of a routine worker in the art, and is not a feature of the present invention it is not illustrated or described in further detail herein.

The head members 14 are of concavo-convex curvature, and the inner surface of each head member is coated with a non-drying, tacky, adhesive substance which may be generally similar, for example, to that used on conventional sticky fly-paper, or on the tackier types of pressure-sensitive tape. A great deal of work has been done in the field of non-drying sticky coatings, so that suitable material is available for this purpose.

Preferably the adhesive coating material should have a long shelf-life, it should be thixotropic so that there is no danger of its runnnig or dripping off and staining or damaging any object over which the head member is positioned, it should be substantially odor-free, or in any event should not have an undesirable odor, and it should be transparent.

The particular means for attaching the handle to a selected head member are not necessarily limited to that shown in FIGS. 1 and 3, and an example of another form of handle attachment is shown in FIG. 4. There a handle 10' is provided having a friction-held, hinged joint 15, and a vacuum cup end portion 16 which can be releasably attached by suction by pressing it onto a selected head member 14. With the suction cup handle 10' the only purpose of the protuberances 13 and 13a is to prevent contact of the coated interior of one of one head member with the uncoated exterior of another one nested therein.

It is preferred that a rim portion at the base of each head member 14 be left uncoated, for example, of the width indicated by the broken line 17 in FIGS. 1–4. Then, in the event that the base edge of the head member should come in contact with an object, such as the dish 18 in FIG. 1, none of the coating material would touch it.

In the modified form of the invention shown in FIGS. 5–7 a fly catcher B comprises a handle 19 having a clear plastic annular portion 20 with an inturned integral flange 21 around its upper end. An annular bead 22 having a head attaching recess in its outward side is integral with the rim 21. A plurality of shallow concavo-convex head members 23 are provided of thin, clear, plastic material, the rim of each being shaped to have snap-on interengagement with the bead 22. Each head member 23 is coated on its concave side with an adhesive coating of the type described for use in the head members 14 of the form thereof shown in FIGS. 1–4. The adhesive coating terminates at a distance from the edge sufficient to leave an uncoated rim portion for engagement with the bead 22 when assembled therewith as shown in FIG. 5.

To attach one of the head members 23 to the handle portion 20 it is snapped thereon similarly to one of the well-known plastic can covers which are in widespread use for resealing a can of coffee or other product after it has been opened. The head member 23 can be removed from the portion 20 by inserting one's fingernail 24 (FIG. 5) beneath the edge of the closure portion 23 and pulling it free.

The closure portions 23 preferably are packaged in superposed relation in a suitable holder, for example, that C shown in FIG. 5, wherein a disk-like lower portion 27 encloses and seals off the concave, adhesive coated side of the lowermost head member 23 therein, while three fragmentary wall portions 28, 29 and 30 support the head members in superposed relation.

The fly catcher B of FIGS. 5–7 is used in the same manner as that described for the fly catcher A of FIGS. 1–4.

The invention provides a simple, inexpensive, sanitary and convenient fly catcher which catches a fly without even touching an object upon which the fly is resting. It can be used until a desired number of flies have been caught therein, at which time the adhesive lined head member can be easily removed and discarded along with the flies that have been caught therein and a fresh head member mounted on the handle for continued use. This head memebr replacement procedure can be repeated indefinitely, provided a supply of the coated head members is maintained on hand.

While I have illustrated and described a preferred embodiment of the present invention, it will be understood, however, that various changes and modifications may be made in the details thereof without departing from the scope of the invention as set forth in the appended claims.

I claim:
1. A fly catcher comprising:
 (a) an annular transparent base member;
 (b) a transparent head member attached to said base member and including a transverse wall proportioned and configured to close one end of the base member to provide a surface facing into said base member; and
 (c) a layer of tacky transparent adhesive material on the inwardly facing surface of said head member, a marginal rim portion of said head member being devoid of said adhesive material, said adhesive material being of a type to adherently retain a fly coming in contact therewith.

2. The combination according to claim 1, in which said head member is selectively separable from said base member, and means are provided for removably attaching said head member to one end of the base member.

3. The combination according to claim 2, in which means are provided on one end of said base member releasably engageable by said marginal rim portion of said head member to effect selective separation of said head member from said base member.

4. The combination according to claim 1, in which said head member is proportioned and configured to permit stacking of a multiplicity of said head members one upon the other and means are provided supporting the adhesive coated surface of each head member spaced from the associated surface of an adjacent head member when a multiplicity of such head members are stacked.

References Cited

UNITED STATES PATENTS

| | | | |
|---|---|---|---|
| 1,470,435 | 10/1923 | Fowler | 43—136 |
| 1,478,330 | 12/1923 | Fowler | 43—136 |
| 1,480,539 | 1/1924 | Crecu | 43—114 |
| 1,802,774 | 4/1931 | Nixon | 43—136 |
| 1,861,378 | 5/1932 | Bloodgood | 43—136 |
| 1,888,563 | 11/1932 | Nixon | 43—136 |
| 2,437,447 | 3/1948 | Tarbell | 43—136 |
| 2,618,882 | 11/1952 | Martin | 43—136 |
| 3,031,794 | 5/1962 | Zalkind | 43—137 |

ALDRICH F. MEDBERY, *Primary Examiner.*

U.S. Cl. X.R.

43—115